United States Patent [19]

Thapar

[11] Patent Number: 4,651,320
[45] Date of Patent: Mar. 17, 1987

[54] INBAND CODING OF SECONDARY DATA

[75] Inventor: Hemant K. Thapar, Campbell, Calif.

[73] Assignees: American Telephone and Telegraph Company, New York, N.Y.; AT&T Information Systems Inc., Morristown, N.J.

[21] Appl. No.: 685,487

[22] Filed: Dec. 24, 1984

[51] Int. Cl.⁴ .............................................. H04L 3/00
[52] U.S. Cl. ...................................... 370/119; 375/39
[58] Field of Search ............... 370/110.4, 119; 375/39, 375/110.4

[56] References Cited

U.S. PATENT DOCUMENTS

| 3,955,141 | 5/1976 | Lyon et al. | 375/39 |
| 4,227,152 | 10/1980 | Godard et al. | 375/39 |
| 4,271,527 | 6/1981 | Armstrong | 375/39 |
| 4,408,325 | 10/1983 | Grover | 370/119 |
| 4,442,530 | 4/1984 | Parrish, Jr. et al. | 375/39 |
| 4,571,549 | 2/1986 | Lods et al. | 375/39 |

Primary Examiner—Douglas W. Olms
Assistant Examiner—Kenneth I. Rokoff
Attorney, Agent, or Firm—Ronald D. Slusky

[57] ABSTRACT

In a system for communicating primary and secondary data from a transmitter to a receiver, each of a first plurality of primary data word values is communicated by the transmitter by transmitting an individual channel symbol associated with that value, while each of at least two other primary data word values are communicated by transmitting a selected one of at least two other channel symbols associated with that primary data word value. A predetermined one of the two channel symbols associated with the first primary data word value is transmitted only when secondary data having a first value is to be communicated, and a predetermined one of the two channel symbols associated with the second primary data word value is transmitted only when secondary data having a second value is to be communicated. In the receiver, both the primary and secondary data word values are recovered from the channel symbols thus transmitted.

16 Claims, 3 Drawing Figures

INBAND CODING OF SECONDARY DATA

BACKGROUND OF THE INVENTION

The present invention relates to techniques for communicating primary and secondary data streams over a communication channel.

It is often desirable in data communications applications to transmit not only principal, or primary, data, but also secondary data. For example, present-day voiceband data sets, or modems—particularly those designed for private-line operation—are often arranged to not only transmit the so-called user's data, but also diagnostic and/or maintenance data via which the data sets themselves communicate.

Conventionally, the available transmission bandwidth is divided into so-called primary and secondary channels in which the primary and secondary data are respectively transmitted. Depending, however, on the desired primary data transmission speed and the expected quality of the transmission channel, the primary channel bandwidth requirements may be such as to preclude this approach because every Hertz of bandwidth may be needed for the primary channel.

SUMMARY OF THE INVENTION

In accordance with the present invention, each one of a first plurality of primary data word values is communicated by transmitting an individual channel symbol associated with that particular value, as is conventional, while each of at least first and second other primary data word values is communicated by transmitting a selected one of at least two channel symbols associated with that primary data word value, a predetermined one of the two channel symbols associated with the first primary data word value being transmitted only when secondary data having a first value is to be communicated and a predetermined one of the two channel symbols associated with the second primary data word value being transmitted only when secondary data having a second value is to be communicated. In the receiver, both the primary and secondary data word values are recorded from the channel symbols thus transmitted.

DETAILED DESCRIPTION

Figure 1:
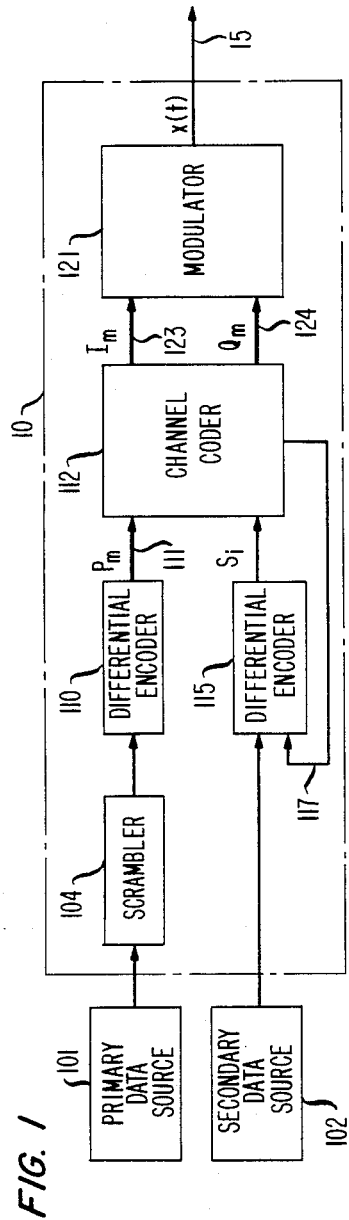
FIG. 1 is a block diagram of a data communication transmitter embodying the principles of the invention.

Transmitter 10 of FIG. 1 includes a scrambler 104, primary data differential encoder 110, secondary data differential encoder 115, channel coder 112 and double sideband-quadrature carrier (DSB-QC) modulator 121.

Scrambler 104, in particular, receives a stream of binary data from primary data source 101 which may be, for example, a digitial computer. Scrambler 104, which is of conventional design, pseudo-randomizes the primary data to prevent concentrations of energy across the spectrum of the DSB-QC signal ultimately to be generated by modulator 121. The output of scrambler 104 is a serial bit stream which is applied to differential encoder 110 at a rate of n/T bits/second, where 1/T is a predetermined symbol rate and n is a predetermined integer. Illustratively, for a 9600 bps system, $1/T = 2400$ and $n = 4$.

Differential encoder 110, which is also of conventional design, processes each successive group of $n = 4$ bits provided from source 101 during the $m^{th}$ baud interval to generate a differentially encoded 4-bit word $P_m$ on cable 111. In accordance with conventional practice, the differential encoding performed by differential encoder 110 is such as to allow the receiver to recover the transmitted data correctly, notwithstanding possible symbol constellation "rotations" as the result, for example, of phase hits in the transmission channel.

At the same time, secondary data from a secondary data source 102 is applied to secondary differential encoder 115. Secondary data source 102, which may be, for example, a microprocessor-based subsystem of a data set, or modem, of which transmitter 10 is a part, generates various diagnostic and/or maintenance signals which are to be conveyed to, for example, a companion unit within a data set of which receiver 20 (FIG. 2) is a part. The output of secondary differential encoder 115 is a stream of secondary data words $S_i$. In this embodiment, as will be seen, each of words $S_i$ illustratively comprises a single data bit.

The primary and secondary data words are applied to channel coder 112. The latter responds to those inputs to generate on cables 123 and 124 digital representations of the in-phase and quadrature-phase components of a particular two-dimensional channel symbol, or point, of a predetermined signal constellation, the in-phase and quadrature-phase components generated for the $m^{th}$ symbol interval being designated $I_m$ and $Q_m$, respectively. Cables 123 and 124 extend to modulator 121, which generates a DSB-QC signal whose in-phase and quadrature-phase carriers have $I_m$ and $Q_m$ as their respective amplitudes for the $m^{th}$ symbol interval, so that the so-called carrier "state"—meaning those characteristics of the carrier signal which are information-bearing—is fixed for the duration of the transmission of the channel symbol in question. The DSB-QC signal thus generated, after conventional spectral shaping, is applied to a transmission, or communication, channel 15 as signal x(t).

Figure 3:
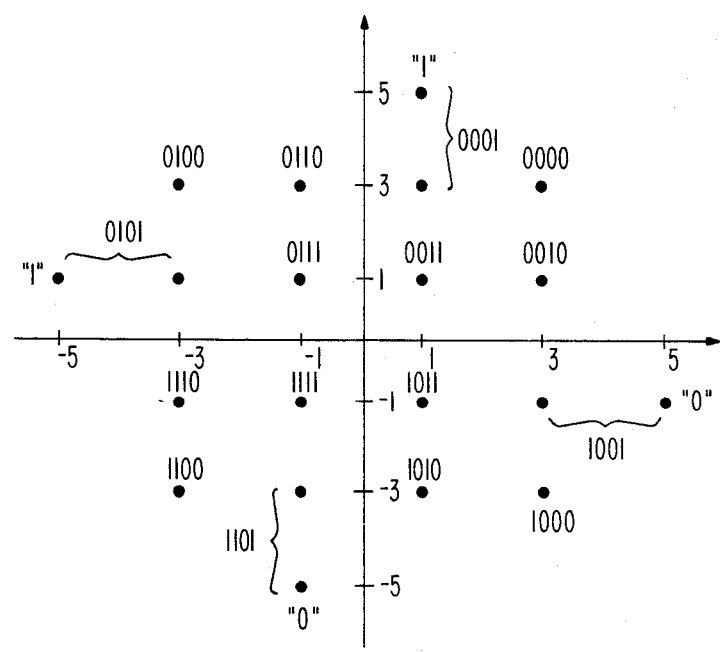
FIG. 3 is an exemplary constellation of channel symbols used to communicate primary and secondary data between the transmitter of FIG. 1 and receiver of FIG. 2 in accordance with the invention.

FIG. 3 depicts the aforementioned signal constellation. This constellation includes the points of a standard 16-point quadrature amplitude modulation (QAM) constellation, each of whose channel symbols has in-phase and quadrature-phase components having one of the four values $\pm 1$, $\pm 3$. The constellation further includes the four additional points $(1,5)$, $(-5,1)$, $(5,-1)$ and $(-1, -5)$, for a total of twenty. As shown in FIG. 3, each one of twelve of the sixteen possible 4-bit values for word $P_m$ generated by differential encoder 110 is uniquely associated with, or represents, a single one of the constellation points, these being the values 0100, 0110, 0000, 0111, 0011, 0010, 1110, 1111, 1011, 1100, 1010 and 1000, which are respectively associated with, or represent, the constellation points $(-3,3)$, $(-1,3)$, $(3,3)$, $(-1,1)$, $(1,1)$, $(3,1)$, $(-3,-1)$, $(-1,-1)$, $(1,-1)$, $(-3,-3)$, $(1,-3)$, and $(3,-3)$. In accordance with the invention, each one of the other four possible 4-bit values for word $P_m$—0001, 0101, 1001 and 1101—is associated with, or represents, a respective two constellation points, each set of two points, in this embodiment, having either their x or y coordinates in common. In particular, 0001 is associated with the points (1,3) and (1,5), 0101 is associated with the points (−3,1) and (−5,1), 1001 is associated with the points (3,−1) and (5,−1), and 1101 is associated with the points (−1,−3) and (−1,−5).

Whenever word $P_m$ has one of the twelve values, 0100, 0110, 0000, 0111, 0011, 0010, 1110, 1111, 1011, 1100, 1010 and 1000, channel encoder 112 generates as $I_m$ and $Q_m$ the in-phase and quadrature-phase components of the one and only symbol with which that value is associated. The fact, however, that there are two symbols associated with each of the values 0001, 0101, 1001 and 1101 allows for the secondary data words $S_i$ to be transmitted, the particular one of the two symbols that is actually transmitted being, in fact, a function of the value of that word. In particular, whenever primary data word $P_m$ has the value 0001 (0101) and the next secondary data word $S_i$ waiting to be transmitted is a "1", channel coder 112 generates the symbol (1,5) (the symbol (−5,1)). Similarly, whenever $P_m$ has the value 1001 (1101) and the next $S_i$ waiting to be transmitted is a "0", channel coder 112 generates the symbol (5,−1) (the symbol (−1,−5)).

The overall mapping of primary and secondary data word values to in-phase and quadrature-phase symbol component values performed by channel coder 112 is shown in Table I,

TABLE I

| $P_m$ | $S_i$ | $I_m$ | $Q_m$ |
|---|---|---|---|
| 0000 | x | 3 | 3 |
| 0001 | 0 | 1 | 3 |
| 0001 | 1 | 1 | 5 |
| 0010 | x | 3 | 1 |
| 0011 | x | 1 | 1 |
| 0100 | x | −3 | 3 |
| 0101 | 0 | −3 | 1 |
| 0101 | 1 | −5 | 1 |
| 0110 | x | −1 | 3 |
| 0111 | x | −1 | 1 |
| 1000 | x | 3 | −3 |
| 1001 | 0 | 3 | −1 |
| 1001 | 1 | 5 | −1 |
| 1010 | x | 1 | −3 |
| 1011 | x | 1 | −1 |
| 1100 | x | −3 | −3 |
| 1101 | 0 | −1 | −3 |
| 1101 | 1 | −1 | −5 |
| 1110 | x | −3 | −1 |
| 1111 | x | −1 | −1 | in which x indicates that no secondary data word is transmitted. Channel coder 112 is illustratively realized as a read-only memory which implements this table.

The fact that a secondary data word waiting to be transmitted can be transmitted only when a primary data word has one of two values means that the average information rate for the secondary channel is ⅓ the symbol rate, i.e., ⅓T, assuming that the primary and secondary data word values occur randomly. It also means that transmission of the secondary data is asynchronous. Although not explicitly shown in the drawing, the latter fact simply implies that the secondary data should, for example, be buffered at some point prior to its application to channel coder 112, such as within differential encoder 115. To this end, as shown in the drawing, channel coder 112 is illustratively arranged to feed back a control signal on lead 117 to a buffer within differential encoder 115 as each successive secondary data word is transmitted.

Figure 2:
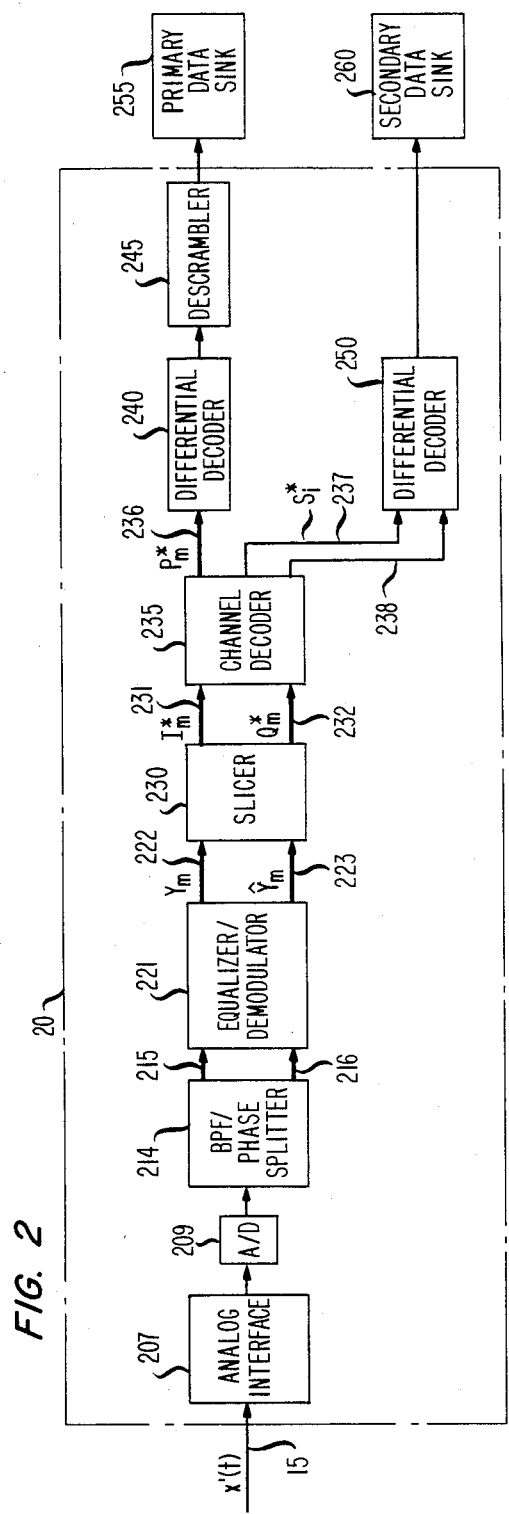
FIG. 2 is a block diagram of a data communication receiver embodying the principles of the invention.

Returning now to the block diagrams, signal x(t) generated by transmitter 10 is corrupted in channel 15 by such impairments as Gaussian noise, phase jitter, frequency offset and intersymbol interference. As shown in FIG. 2, the received corrupted signal x'(t) is applied within receiver 20 to analog interface 207 which includes an antialiasing filter and an automatic gain control (AGC) circuit. The resulting signal is then applied to A/D converter 209. The resulting digital samples are applied to bandpass filter/phase splitter 214. The latter provides two outputs on cables 215 and 216, these being a digital bandpass-filtered version of the A/D converter output and the Hilbert transform of same, respectively.

The signals on cables 215 and 216 are applied to equalizer/demodulator 221, which, for each symbol interval, provides on its output cables 222 and 223 a pair of baseband equalizer outputs $Y_m$ and $\hat{Y}_m$, which respectively represent the values of the in-phase and quadrature-phase components of the received data symbol currently being processed. Because, for example, the equalizer cannot perfectly compensate for all channel impairments, the values of $Y_m$ and $\hat{Y}_m$ are not, in general, whole integers, even though $I_m$ and $Q_m$ are illustratively integer-valued. It thus remains to determine from $Y_m$ and $\hat{Y}_m$ what $I_m$ and $Q_m$ most likely were. This function is performed by slicer 230, which provides on its output cable 231 (232) signal $I_m^*$ ($Q_m^*$), this being a digital representation of the particular one of the values ±1, ±3, ±5 to which the value of $Y_m$ ($\hat{Y}_m$) is closest. $I_m^*$ and $Q_m^*$ then pass to channel decoder 235, which performs the opposite function to channel coder 112 of transmitter 10 by providing on its output cable 236 and output lead 237 the signals $P_m^*$ and $S_i^*$, these being the receiver's decision as to what the values of $P_m$ and $S_i$ were. Decoder 235 is illustratively realized as a read-only memory implementing Table II,

TABLE II

| $I_m^*$ | $Q_m^*$ | $P_m^*$ | $S_i^*$ |
|---|---|---|---|
| 1 | 1 | 0011 | x |
| 1 | 3 | 0001 | x |
| 1 | 5 | 0001 | 1 |
| 3 | 1 | 0010 | x |
| 3 | 3 | 0000 | x |
| 3 | 5 | 0000 | x |
| 5 | 1 | 0010 | x |
| 5 | 3 | 0000 | x |
| 5 | 5 | 0000 | x |
| 1 | −1 | 1011 | x |
| 1 | −3 | 1010 | x |
| 1 | −5 | 1010 | x |
| 3 | −1 | 1001 | x |
| 3 | −3 | 1000 | x |
| 3 | −5 | 1000 | x |
| 5 | −1 | 1001 | 0 |
| 5 | −3 | 1000 | x |
| 5 | −5 | 1000 | x |
| −1 | 1 | 0111 | x |
| −1 | 3 | 0110 | x |
| −1 | 5 | 0110 | x |
| −3 | 1 | 0101 | x |
| −3 | 3 | 0100 | x |
| −3 | 5 | 0100 | x |
| −5 | 1 | 0101 | 1 |
| −5 | 3 | 0100 | x |
| −5 | 5 | 0100 | x |
| −1 | −1 | 1111 | x |
| −1 | −3 | 1101 | x |
| −1 | −5 | 1101 | 0 |
| −3 | −1 | 1110 | x |
| −3 | −3 | 1100 | x |
| −3 | −5 | 1100 | x |
| −5 | −1 | 1110 | x |
| −5 | −3 | 1100 | x |

TABLE II-continued

| $I_m^*$ | $Q_m^*$ | $P_m^*$ | $S_i^*$ |
|---|---|---|---|
| −5 | −5 | 1100 | x | where x denotes that no secondary data word is output. Word $P_m^*$ is then differentially decoded and descrambled by primary data decoder 240 and descrambler 245, respectively, and then applied to primary data sink 255 which may be, for example, a computer terminal. Word $S_i$ is differentially decoded by secondary data differential decoder 250 and thence applied to secondary data sink 260 which may be, for example, a subsystem within a data set of which receiver 20 is a part.

A flag bit on lead 238 is activated by decoder 235 each time word $P_m^*$ is one of the four words 0001, 0101, 1001 or 1101, thereby indicating to differential decoder 250 that the present signal level on lead 237 represents a newly-arrived secondary data word.

Since the symbols of the FIG. 3 constellation representing secondary data "0"s and "1"s are widely separated in the constellation, random errors, i.e., the detection of a "1" when a "0" was transmitted and vice versa, will hardly ever occur. Two kinds of errors that are more likely to occur in the secondary data, however, are "additions" and "erasures". An erasure occurs whenever one of the points (1,5), (1,−5), (−1,5) or (−1,−5) is actually transmitted but due, for example, to a transmission error, the decision at the receiver is that one of the other sixteen points of the constellation was transmitted. An addition occurs when the decision at the receiver is that one of the points (1,5), (1,−5), (−1,5) or (−1,−5) was transmitted even though the point that was actually transmitted is one of the other sixteen points.

Such errors can be detected by, for example, transmitting each secondary data bit twice. If this repetition is not observed by secondary data sink 260, it is known that an error has occurred, in which case data sink 260 can initiate a request for secondary data source 102 to retransmit the erroneous data (it being assumed that the transmitter and receiver of FIGS. 1 and 2 are parts of respective data sets in which a similar transmitter-/receiver pair communicates primary and secondary data in the other direction over channel 15). Synchronization can then be re-established by having secondary data source 102 initially transmitting a known bit sequence.

Going beyond error detection, an error correction technique can be implemented which allows synchronization to be automatically maintained. In accordance with one such possible approach, each secondary data bit is repeated three times, and secondary data sink 260 uses majority-logic decoding to ascertain the correct value. Whichever bit value within each group of three bits occurs at least twice is taken to be the secondary bit value. Of course, in the absence of any transmission error, the values of all three received bits will be the same. If, on the other hand, only two out of the three bits have the same value, a transmission error has occurred. Since, as discussed above, a random transmission error is highly unlikely, the error can be assumed to be the result of either an erasure or an addition. The secondary channel communications must thus be re-synchronized. That is, it must be re-determined within data sink 260 where each group of three transmitted bits begins and ends. Advantageously, this can be determined, at least to some extent, from the secondary bit stream itself.

In particular, it can be easily shown that the reception of a 001 or a 110 means that an erasure has occurred. In order to re-acquire synchronization, only the first two, instead of all three, bits are used to decode the secondary bit value and the last bit of the group is reassigned to be the first bit of the following group. Normal majority-logic decoding is then resumed. It can also be easily shown that the reception of 100 or 011 means that an addition has occurred. In this case, synchronization is re-acquired by dropping the next received bit and, again, resuming normal majority-logic decoding. Finally, the reception of either a 010 or a 101 means that two additions or erasures have taken place in close proximity to one another. The above-outlined procedure is effective to detect such errors but it cannot correct for them. In this case, a request for re-transmission must be initiated.

The foregoing merely illustrates the principles of the invention. For example, the constellation of FIG. 3 can be used to transmit the secondary data in the following somewhat different way: Whenever any of the 4-bit word values 0001, 0101, 1001 or 1101 is to be transmitted, the next secondary data word is examined. If it is a "0", the corresponding one of points (1,3), (−3,1), (3,−1) and (1,−3) is transmitted. If it is a "1", the corresponding one of points (1,5), (−5,1), (5,−1) and (1,−5) is transmitted. This approach provides twice the secondary channel bit rate as for the approach previously described because now a secondary data word is transmitted each time one of the 4-bit word values 0001, 0101, 1001 or 1101 is transmitted, rather than this being a function of what the secondary data word value is. Moreover, this approach does not require the secondary data to be differentially encoded because, even if there were to be a rotation of the constellation in the receiver, any of the four points (1,5), (−5,1), (5,−1) and (1,−5) will still be correctly detected as a secondary channel "1". A disadvantage of this approach, however, is that since symbols representing secondary channel data are close to one another in the constellation, the likelihood of random secondary channel errors is substantially greater than in the approach first described. An additional characteristic of this approach is that a secondary channel value is necessarily transmitted each time one of the primary channel words 0001, 0101, 1001 or 1101 is transmitted. This, in turn, implies the need for a transmission format in the secondary channel to distinguish between, for example, "0"s that represent data and "0"s that do not.

In accordance with a further possible variation, the secondary-channel information-bearing symbols (1,5), (−5,1), (−1,−5), and (5,−1) could be transmitted when, for example, the primary data word values 0000, 0100, 1100 and 1000—associated with the points (3,3), (−3,3), (−3,−3) and (3,−3)—are to be transmitted rather than when the primary data word values 0001, 0101, 1101 and 1001—associated with the points (1,3), (−3,1), (−1,−3) and (3,−1)—are to be transmitted. This approach reduces the SNR loss in the primary channel from 0.79 dB to 0.41 dB, which would tend to improve the primary data error rate. Such an improvement will, however, tend to be offset by the fact that any additions and erasures will now result not only in secondary channel errors, but primary channel errors as well.

Further variations are, of course, possible, including selection of different, and a different number of, symbols, including different in-phase and quadrature-phase component values, to carry the secondary data, as well as the possibility of encoding secondary data words of more than one bit. As an example of the latter, the constellation of FIG. 3 could be used in the following way: Whenever the point (3,3), for example, would otherwise be transmitted, i.e., $P_m$ is 0000, and there is secondary data to be transmitted, a particular one of the four points (1,5), (−5,1), (5,−1) and (1,−5) is transmitted instead, depending on whether the secondary data word to be transmitted is 00, 01, 11 or 10, respectively. Since the point (3,3) occurs at the average rate 1/16T times per second assuming random data), and each occurrence conveys two bits of secondary data, this scheme provides a 1/8T bps secondary channel. The theoretical SNR loss in the primary channel is 0.21 dB but, again, the effect of erasures and additions on the primary channel error rate must be taken into account in evaluating this approach for a particular application. Three-bit secondary data words can be transmitted in a similar way by transmitting a particular one of the eight points (1,5), (−1,5), (−5,1), (−5,−1), (5,1), (5,−1) (−1,−5) and (1,−5), depending on whether the secondary data word to be transmitted is 000, 011 100, 101, 000, 001, 110 or 111, respectively. The SNR loss in the primary channel remains unchanged at 0.21 dB. Now, however, random secondary channel errors are more likely to occur because of the close proximity of symbols that represent secondary data.

If it is guaranteed that secondary data will always be available for transmission or if the transmission format is such that a particular bit pattern, e.g., 00 in the 2-bit case or 000 in the 3-bit case, can be sent even in the absence of any data to be transmitted, the point (3,3) could be totally eliminated from the constellation in either of these arrangements. It is important to observe, however, that the resultant signal constellation would then be asymmetrical and the effect of this asymmetry—particularly in the receiver's equalizer—would have to be evaluated before this approach were adopted.

Moreover, it should be further appreciated that the invention is applicable to virtually any type of constellation geometry, including constellations which are other than rectilinear (e.g., circular), constellations having various data word/symbol value assignment schemes, and constellations whose data symbols have more than two dimensions. In addition, the invention can be used equally well in block, convolutional or other types of coding applications as well as with various types of modulation including, for example, QAM, phase shift keying, etc.

Each of the various possible approaches will have its own set of advantages and disadvantages, as will be apparent from the foregoing discussion, and the particular embodiment of the invention used for a particular application should, of course, be chosen based on the requirements and characteristics of that application.

It will thus be appreciated that those skilled in the art will be able to devise numerous arrangements which, although not explicitly shown or described herein, embody the principles of the invention and are within its spirit and scope.

What is claimed is:

1. Apparatus comprising
    means for receiving a first stream of data words,
    means for receiving a second stream of data words, and
    means operative when an individual one of said first stream words has one of a predetermined plurality of values for applying to a communications channel an individual one of a predetermined plurality of channel symbols, said one channel symbol being uniquely associated with that one value, and operative when said individual one of said first stream words has one of at least first and second other values for applying to said channel a selected one of at least two channel symbols associated with that one other value, a predetermined one of the two channel symbols associated with said first other value being transmitted only when an individual one of said second stream words having a first value is to be communicated, the other one of those two channel symbols being transmitted only when an individual one of said second stream words is not to be communicated, a predetermined one of the two channel symbols associated with said second other value being transmitted only when an individual one of said second stream words having a second value is to be communicated, the other one of the last-recited two channel symbols being transmitted only when an individual one of said second stream words is not to be communicated.

2. The invention of claim 1 wherein each one of said channel symbols comprises a carrier signal having a carrier state that is fixed for the duration of the transmission of that channel symbol.

3. The invention of claim 1 wherein each of said channel symbols is represented by a point in the complex plane and where each of said two other channel symbols has one coordinate in common.

4. The invention of claim 1 wherein each of said first stream words is a multibit word and each of said second stream words is a single-bit word.

5. Apparatus for use in a data communication system which comprises means for receiving a first stream of data words; means for receiving a second stream of data words; and means operative when an individual one of said first stream words has one of a predetermined plurality of values for applying to a communications channel an individual one of a predetermined plurality of channel symbols, said one channel symbol being uniquely associated with that one value, and operative when said individual one of said first stream words has one of at least first and second other values for applying to said channel a selected one of at least two channel symbols associated with that one other value, a predetermined one of the two channel symbols associated with said first other value being transmitted only when an individual one of said second stream words having a first particular value is to be communicated, the other one of those two channel symbols being transmitted only when an individual one of said second stream words is not to be communicated, a predetermined one of the two channel symbols associated with said second other value being transmitted only when an individual one of said second stream words having a second particular value is to be communicated, the other one of the last-recited two channel symbols being transmitted only when an individual one of said second stream words is not to be communicated; said apparatus comprising
    means for receiving each of said transmitted channel symbols from said channel, means for applying to a first output the primary stream data word value associated with each received channel symbol, and means operative when an individual one of said received channel symbols is said predetermined one of the two channel symbols associated with said first other value for applying said first particular value to a second output and operative when said individual one of said received channel symbols is said predetermined one of the two channel symbols associated with said second other value for applying said second particular value to said second output, neither of said first and second particular values being applied to said second output when said individual one of said received channel symbols is either of said other channel symbols.

6. The invention of claim 5 wherein each one of said channel symbols comprises a carrier signal having a carrier state that is fixed for the duration of the transmission of that channel symbol.

7. The invention of claim 5 wherein each one of said channel symbols is represented by a point in the complex plane and wherein each of said two other channel symbols has one coordinate in common.

8. The invention of claim 5 wherein each of said first stream words is a multibit word and each of said second stream words is a single-bit word.

9. A method comprising the steps of
receiving a first stream of data words,
receiving a second stream of data words,
applying to a communications channel when an individual one of said first stream words has one of a predetermined plurality of values an individual one of a predetermined plurality of channel symbols, said one channel symbol being uniquely associated with that one value, and
applying to said channel when said individual one of said first stream words has one of at least first and second other values a selected one of at least two channel symbols associated with that one other value, a predetermined one of the two channel symbols associated with said first other value being transmitted only when an individual one of said second stream words having a first value is to be communicated, the other one of those two channel symbols being transmitted only when an individual one of said second stream words is not to be communicated, a predetermined one of the two channel symbols associated with said second other value being transmitted only when an individual one of said second stream words having a second value is to be communicated, the other one of the last-recited two channel symbols being transmitted only when an individual one of said second stream words is not to be communicated.

10. The invention of claim 9 wherein each one of said channel symbols comprises a carrier signal having a carrier state that is fixed for the duration of the transmission of that channel symbol.

11. The invention of claim 9 wherein each of said channel symbols is represented by a point in the complex plane and wherein each of said two other channel symbols has one coordinate in common.

12. The invention of claim 9 wherein each of said first stream words is a multibit word and each of said second stream words is a single-bit word.

13. A method for use in a data communication system which comprises means for receiving a first stream of data words; means for receiving a second stream of data words; and means operative when an individual one of said first stream words has one of a predetermined plurality of values for applying to a communications channel an individual one of a predetermined plurality of channel symbols, said one channel symbol being uniquely associated with that one value, and operative when said individual one of said first stream words has one of at least first and second other values for applying to said channel a selected one of at least two channel symbols associated with that one other value, a predetermined one of the two channel symbols associated with said first other value being transmitted only when an individual one of said second stream words having a first particular value is to be communicated, the other one of those two channel symbols being transmitted only when an individual one of said second stream words is not to be communicated, a predetermined one of the two channel symbols associated with said second other value being transmitted only when an individual one of said second stream words having a second particular value is to be communicated the other one of the last-recited two channel symbols being transmitted only when an individual one of said second stream words is not to be communicated; said method comprising the steps of
receiving each of said transmitted channel symbols from said channel,
applying to a first output the primary stream data word value associated with each received channel symbol,
applying said first particular value to a second output when an individual one of said received channel symbols is said predetermined one of the two channel symbols associated with said first other value, and
applying said second particular value to said second output when said individual one of said received channel symbols is said predetermined one of the two channel symbols associated with said second other value and applying neither of said first and second particular values to said second output when said individual one of said received channel symbols is either of said other channel symbols.

14. The invention of claim 13 wherein each one of said channel symbols comprises a carrier signal having a carrier state that is fixed for the duration of the transmission of that channel symbol.

15. The invention of claim 13 wherein each of said channel symbols is represented by a point in the complex plane and wherein each of said two other channel symbols has one coordinate in common.

16. The invention of claim 13 wherein each of said first stream words is a multibit word and each of said second stream words is a single-bit word.

* * * * *